(12) United States Patent
Kimata et al.

(10) Patent No.: US 7,167,195 B2
(45) Date of Patent: Jan. 23, 2007

(54) PICTURE-PHONE DEVICE PROVIDING MEANS FOR GUIDING OPERATOR'S LINE OF SIGHT TO SPECIFIC DIRECTION THEREIN

(75) Inventors: Yusuke Kimata, Tokyo (JP); Shuji Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 821 days.

(21) Appl. No.: 09/739,619

(22) Filed: Dec. 20, 2000

(65) Prior Publication Data

US 2001/0011951 A1    Aug. 9, 2001

(30) Foreign Application Priority Data

Dec. 21, 1999   (JP) ................... 11-363540

(51) Int. Cl.
*H04N 7/14* (2006.01)
(52) U.S. Cl. .............. 348/14.16; 348/14.01; 348/14.03
(58) Field of Classification Search ......... 348/14.01, 348/14.02, 14.03, 14.04, 14.05, 14.07, 14.08, 348/14.09, 14.1, 14.16; 345/753
See application file for complete search history.

(56) References Cited

U.S. PATENT DOCUMENTS 5,786,846 A * 7/1998 Hiroaki ............... 348/14.16

FOREIGN PATENT DOCUMENTS

| EP | 0 493 893 A2 | 7/1992 |
| EP | 0884905 A2 * | 5/1998 |
| JP | 356152387 A * | 4/1980 |
| JP | 363276352 A * | 11/1988 |
| JP | H1-225294 | 9/1989 |
| JP | H1-265685 A | 10/1989 |
| JP | H2-50691 A | 2/1990 |
| JP | H6-217298 A | 8/1994 |
| JP | H9-130768 A | 5/1997 |
| JP | H11-98484 A | 4/1999 |

* cited by examiner

*Primary Examiner*—Melur Ramakrishnaiah
(74) *Attorney, Agent, or Firm*—Sughrue Mion, PLLC

(57) ABSTRACT

A camera 120 for imaging a call-sender, a monitor 110 for projecting the call-receiver who is the party on the other end of the phone and a transceiver 140 used for the call are provided. The transceiver 140 comprises a mike 14a for collecting the voice of the call-sender and a speaker 14b for outputting the voice of the call-receiver. A caption image (an arrow 150) is indicated on the monitor 110 for directing the caller's line of sight to the camera 120 and a light flashing system 130 is provided on the periphery of the camera 120.

11 Claims, 9 Drawing Sheets

UPPER PORTION

LOWER PORTION

LEFT PORTION

RIGHT PORTION

PICTURE-PHONE DEVICE PROVIDING MEANS FOR GUIDING OPERATOR'S LINE OF SIGHT TO SPECIFIC DIRECTION THEREIN

BACKGROUND OF THE INVENTION

The present invention relates to a picture-phone device, and more particularly to a picture-phone device capable of providing an intimate telephone communication between callers on a transmitting and a receiving ends.

A picture-phone device is a device for allowing two persons staying apart to make a conversation looking at images of each other. Therefore, it is preferable for the persons on both ends of the phone to watch a camera of the picture-phone device to each other. In the event the caller's line of sight turns off the position of the camera by a large amount, an image of the caller on one end looking away is seen by the caller on the other end, which may cause a trouble in making a communication smoothly. For example, there is a picture-phone device which provides a function for leading a caller's line of sight to the camera described in unexamined Japanese Patent Publication No. Hei 6-217298 (hereafter called a conventional picture-phone device).

In a conventional picture-phone device, a camera for imaging a caller on a transmitting end is provided behind a screen of a liquid crystal display for projecting a caller on a receiving end. The camera is disposed, for example, at a central portion of the liquid crystal display. And the image of the caller on the transmitting end is transmitted with respect to the picture-phone device of the caller on the receiving end via the camera by providing a specific area on the liquid crystal display with transparency temporally. The above-mentioned specific area can be an area which the camera requires for imaging.

When the picture-phone device transfers the images of thirty frames per second, the specific area on the liquid crystal display is provided with transparency for a certain period of time for transferring image of two frames per second. Then, a usual image is projected during the remaining time for twenty-eight frames (28/30), which gives less uncomfortable feeling to the callers. And two frames of static image are transmitted in one second with respect to the picture-phone device of the caller on the receiving end.

As a caller performs a calling operation watching at a liquid crystal display, the line of sight of the caller on the transmitting end is directed around the center of the liquid crystal display. Therefore, communication between the callers of the transmitting and receiving ends progresses intimately by establishing eye-to-eye contact.

However, the above-mentioned art can not solve the problem that the motion of the image projected on the liquid crystal display during the conversation on the phone gets less active. Because only a few frames (two frames, in the above description) of a static image are transmitted in one second.

Besides, in the event of adding some motions to the image projected on the liquid crystal display during the conversation on the phone, it is necessary to extend the time for providing the specific area on the liquid crystal display with transparency in one second. In the above-mentioned event, the caller is too conscious of the specific area being transparent, which may cause a problem that the image projected on the liquid crystal display gives an uncomfortable feeling.

Further, there are problems that the composition of the conventional picture-phone device becomes complicated and costs for implementation gets high accordingly.

SUMMARY OF THE INVENTION

It is therefore an object of the present invention to solve the above-mentioned problems and to provide a picture-phone device capable of providing an intimate telephone communication between callers.

A picture-phone device relates to the invention claimed in claim 1 having an imaging portion and an image display portion, in which an operator exchanges images and voices with the party on the other end via a communication circuit is composed to provide means for guiding the line of sight for guiding an operator's line of sight to a specific direction.

The picture-phone device relates to the invention claimed in claim 2 provides means for guiding the line of sight which provides indicating means for giving an indication for guiding the line of sight with respect to the operator therein.

The picture-phone device relates to the invention claimed in claim 3 provides control means for controlling indicating means in response to the result of the determination whether the phone is in use or not according to a voice input signal output from a microphone.

The picture-phone device relates to the invention claimed in claim 4 provides indicating means which is a light flashing system for guiding caller's line of sight by light emission.

The picture-phone device relates to the invention claimed in claim 5 provides a light flashing system near the imaging portion.

The picture-phone device relates to the invention claimed in claim 6 provides indicating means which is a caption outputting system for projecting a special visual image in order to guide the caller's line of sight to a specific direction on the picture display portion in the picture-phone device.

The picture-phone device relates to the invention claimed in claim 7 provides a special visual image which is an arrow for indicating the position where the image portion is installed.

DETAILED DESCRIPTION OF THE PREFERRED EMBODIMENTS

Figure 1:
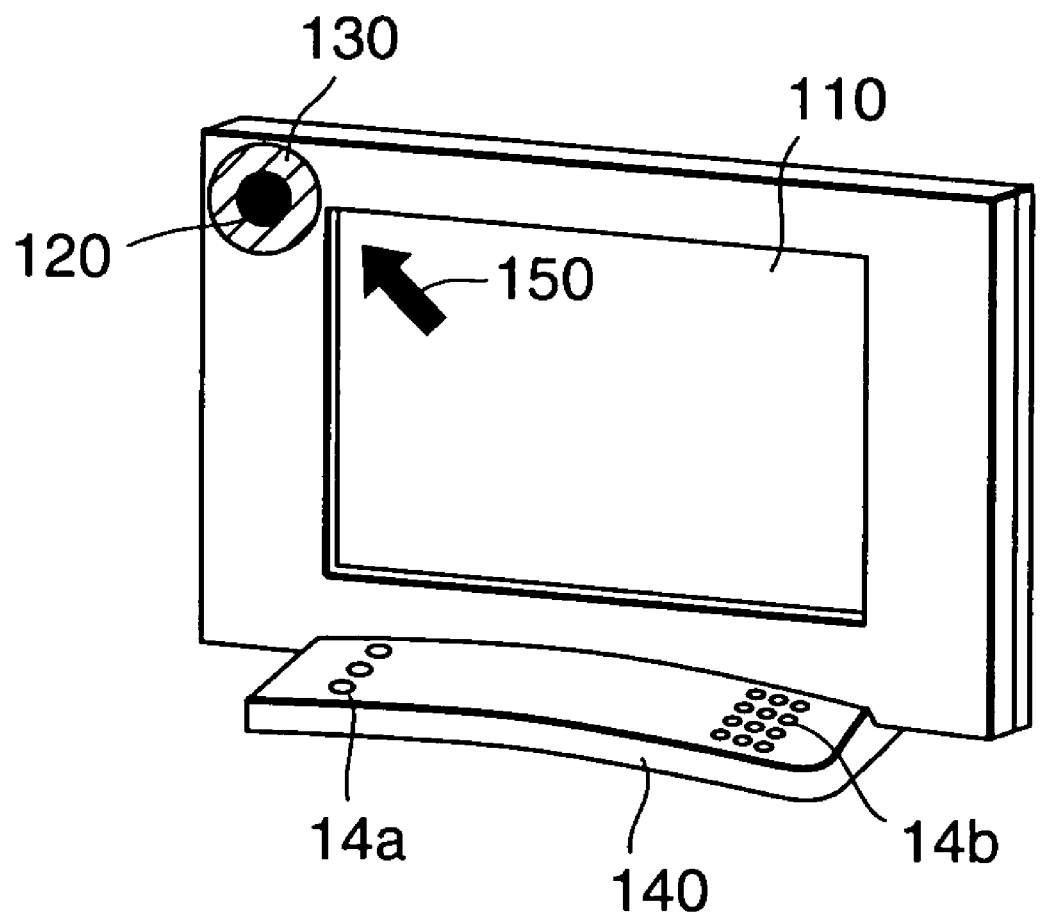
FIG. 1 is an illustration for showing an appearance of a picture-phone device according to the present invention.

Referring now to the drawings, descriptions are made about a picture-phone device according to the preferred embodiment of the present invention. FIG. 1 is an illustration for showing an appearance of a picture-phone device according to the present invention.

A picture-phone device shown in FIG. 1 comprises a monitor 110, a camera 120, a light flashing system 130 and a transceiver 140. The transceiver 140 provides a microphone (hereafter called a mike) 14a and a speaker 14b therein. An arrow 150 for directing a caller's line of sight to the direction where the camera 120 is provided is indicated on the monitor 110. Accordingly, it is possible to direct the caller's line of sight to the camera 120 while the caller is making a conversation looking at the image of the party on the other end projected on the monitor 110. And the image of the caller is imaged by the camera 120 and transmitted with respect to the picture-phone device of the caller on the other end. Hereafter, a caller on a transmitting side is called as a call-sender and a party on the other end is called as a call-receiver.

While making a telephone conversation, a call-sender is guided to direct his or her line of sight to the camera 120 by an operation of the light flashing system 130 or by an indication of the arrow 150 on the monitor 110. In the result, a call-receiver can see the image of the call-sender watching him or her. Therefore, both call-sender and call-receiver can communicate better. Incidentally, the light flashing system 130 is provided near the camera 120. An example shown in FIG. 1 has a composition providing the light flashing system 130 on a periphery of the camera 120.

Figure 2:
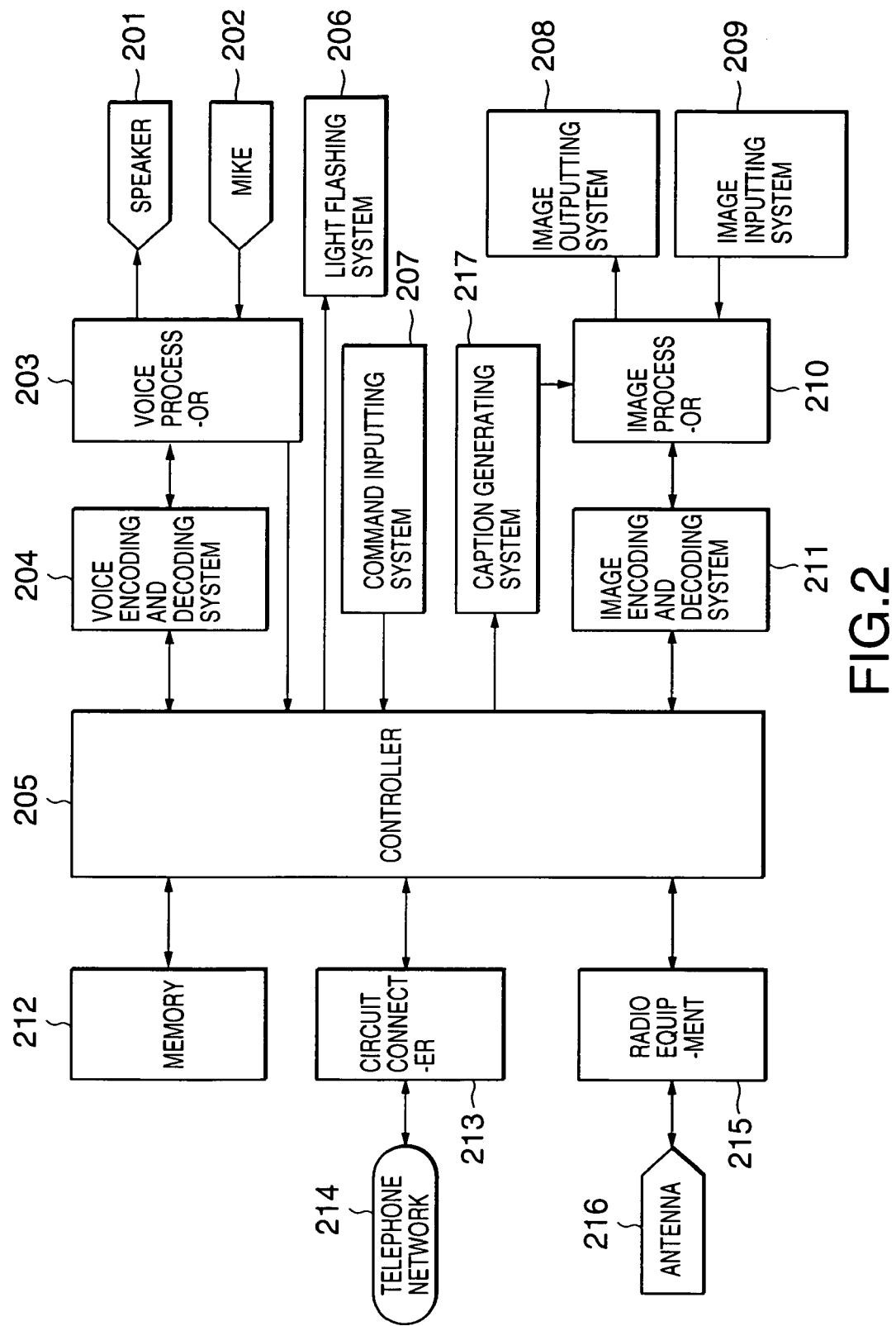
FIG. 2 is a block diagram for showing a composition of a preferred embodiment of the picture-phone device according to the present invention.

FIG. 2 is a block diagram for showing a composition of a preferred embodiment of the picture-phone device according to the present invention. A picture-phone device shown in FIG. 2 comprises a speaker 201, a mike 202, a voice processor 203, a voice encoding and decoding system 204, a controller 205, a light flashing system 206, a command inputting system 207, an image outputting system 208, an image inputting system 209, an image processor 210, an image encoding and decoding system 211, a memory 212, a circuit connector 213, a telephone network 214, a radio equipment 215, an antenna 216 and a caption generating system 217.

A mike 202 collects the voice of a call-sender and outputs the voice as a voice signal with respect to the voice processor 203. The voice processor 203 converts the voice signal from analog to digital and outputs the signal as a digital voice data with respect to the voice encoding and decoding system 204. And the voice processor 203 determines whether the phone is in use or not according to the voice signal in order to output the result of determination with respect to the controller 206. Further, the voice encoding and decoding system 204 encodes the digital voice data and outputs the data as a voice code data with respect to the controller 205.

An image inputting system 209 images the call-sender and outputs the image as a visual image signal with respect to the image processor 210. The image processor 210 converts the visual image signal from analog to digital and outputs the signal as a digital image data with respect to the image encoding and decoding system 211. And the image encoding and decoding system 211 encodes the digital image data and outputs the data as an image code data with respect to the controller 205.

The controller 205 multiplexes the voice code data and the image code data and outputs the multiplexed data with respect to the telephone network 214 via the circuit connector 213. And the controller 205 outputs the multiplexed data with respect to the radio circuit via the radio equipment 215 and the antenna 216 sequentially.

A signal from the picture-phone device on the side of the call-receiver is received by the circuit connector 213 via the telephone network 214. And in the event of using the radio circuit, the signal is received by the radio equipment 215 via the antenna 216. The circuit connector 213 and the radio equipment 215 output the signal from the picture-phone device on the side of the call-receiver with respect to the controller 205.

The controller 205 acquires the voice code data which is a data of a voice component and the image code data which is a data of an image component from the signal transmitted from the picture-phone device on the side of the call-receiver. And the controller 205 outputs the above-mentioned voice code data and the image code data with respect to the voice encoding and decoding system 204 and the image encoding and decoding system 211 respectively. The voice encoding and decoding system 204 decodes the voice code data and outputs the data as a digital voice data with respect to the voice processor 203. Then, the image encoding and decoding system 211 decodes the image code data and outputs the data as a digital image data with respect to the image processor 210.

The voice processor 203 converts the digital voice data from digital to analog and outputs the data as a voice signal with respect to the speaker 201. The speaker 201 outputs the voice of the call-receiver based on the voice signal. And the image processor 210 converts the digital image data from digital to analog and outputs the data as an image signal with respect to the image outputting system 208. Then, the image outputting system 208 projects the image of the call-sender based on the image signal.

A setting associated with control (hereafter called user setting) in the picture-phone device is programmed in the command inputting system 207. The command inputting system 207 notifies the user setting with respect to the controller 205. Then, the controller 205 controls the light flashing system 206 and the caption generating system 217.

Figure 3:
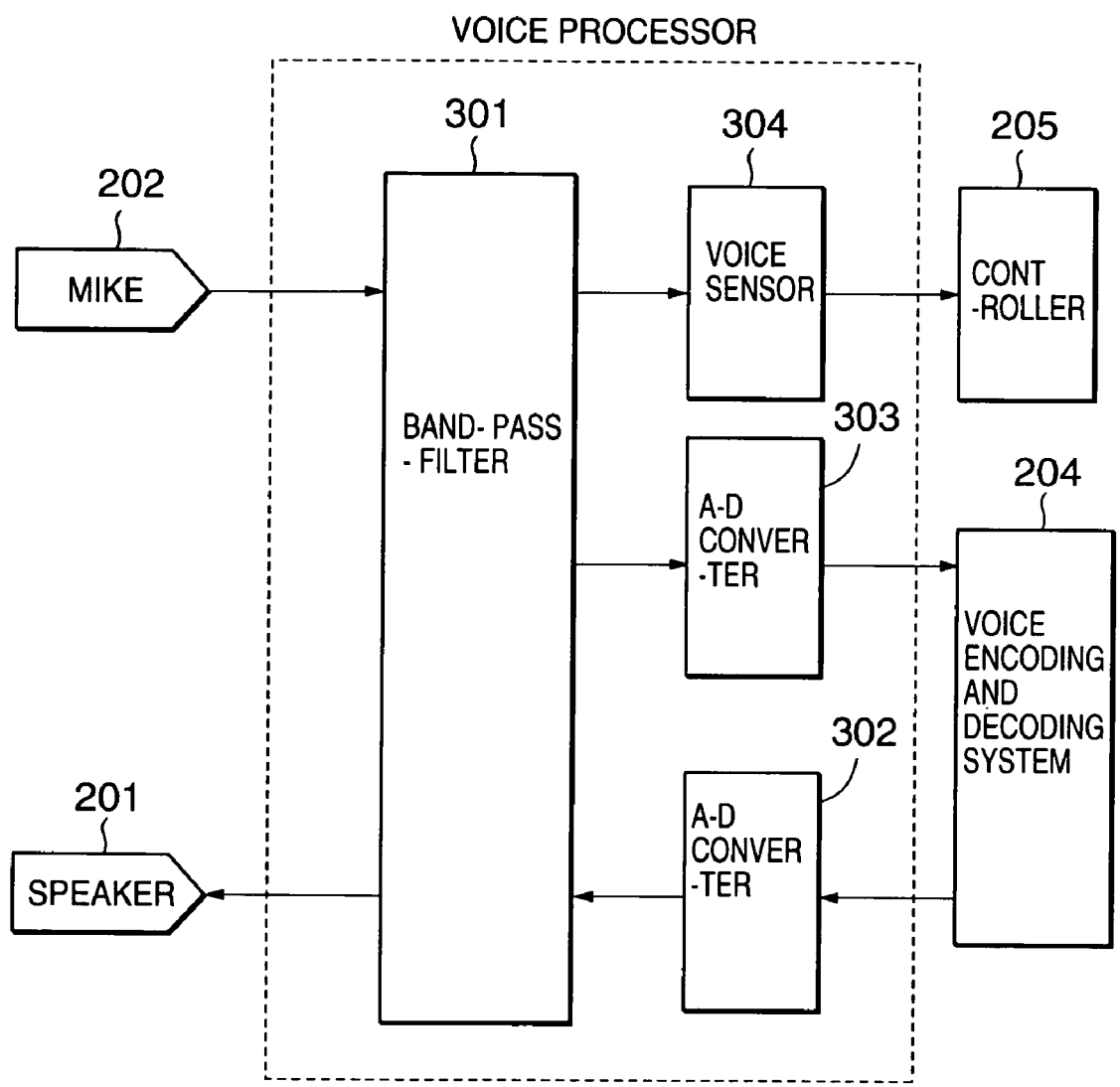
FIG. 3 is a block diagram for showing an inner composition of a voice processor 203.
Figure 4:
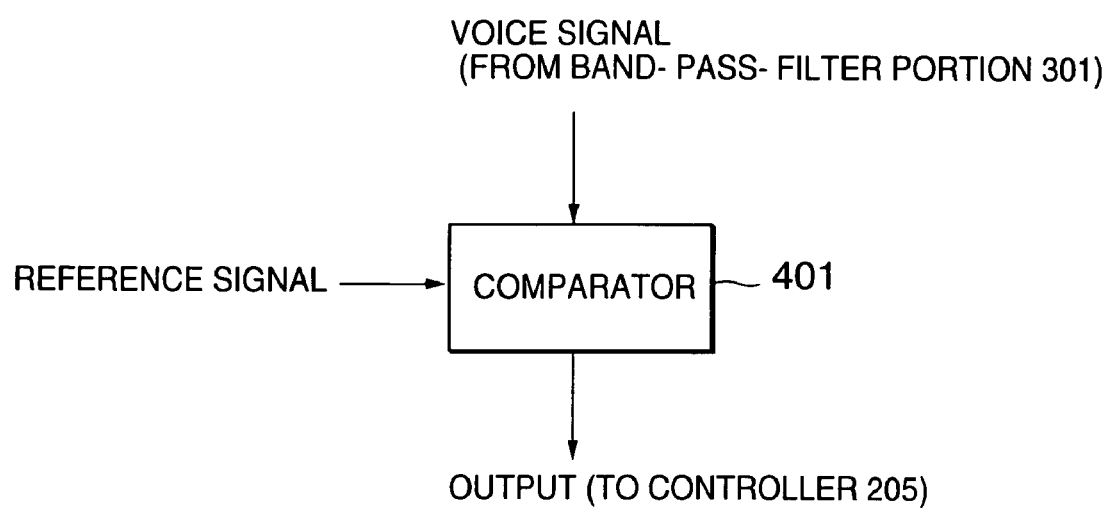
FIG. 4 is a block diagram for showing an inner composition of a voice sensor 304.
Figure 5:
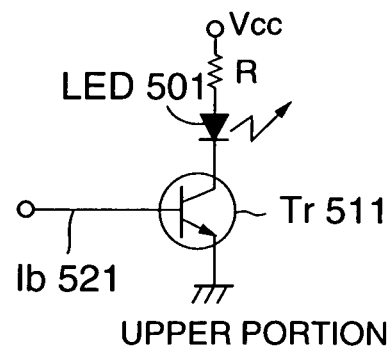
FIG. 5 is an illustration for showing an example of compositions of a light flashing system.
Figure 5:
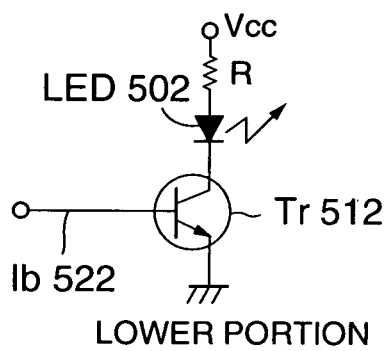
Figure 5:
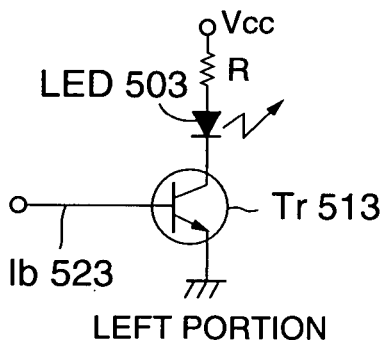
Figure 5:
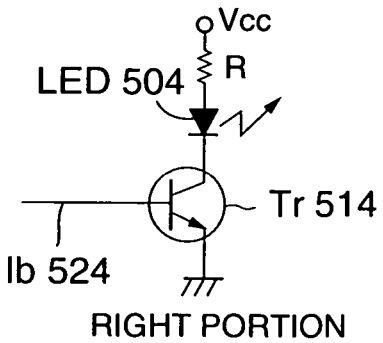
Figure 6:
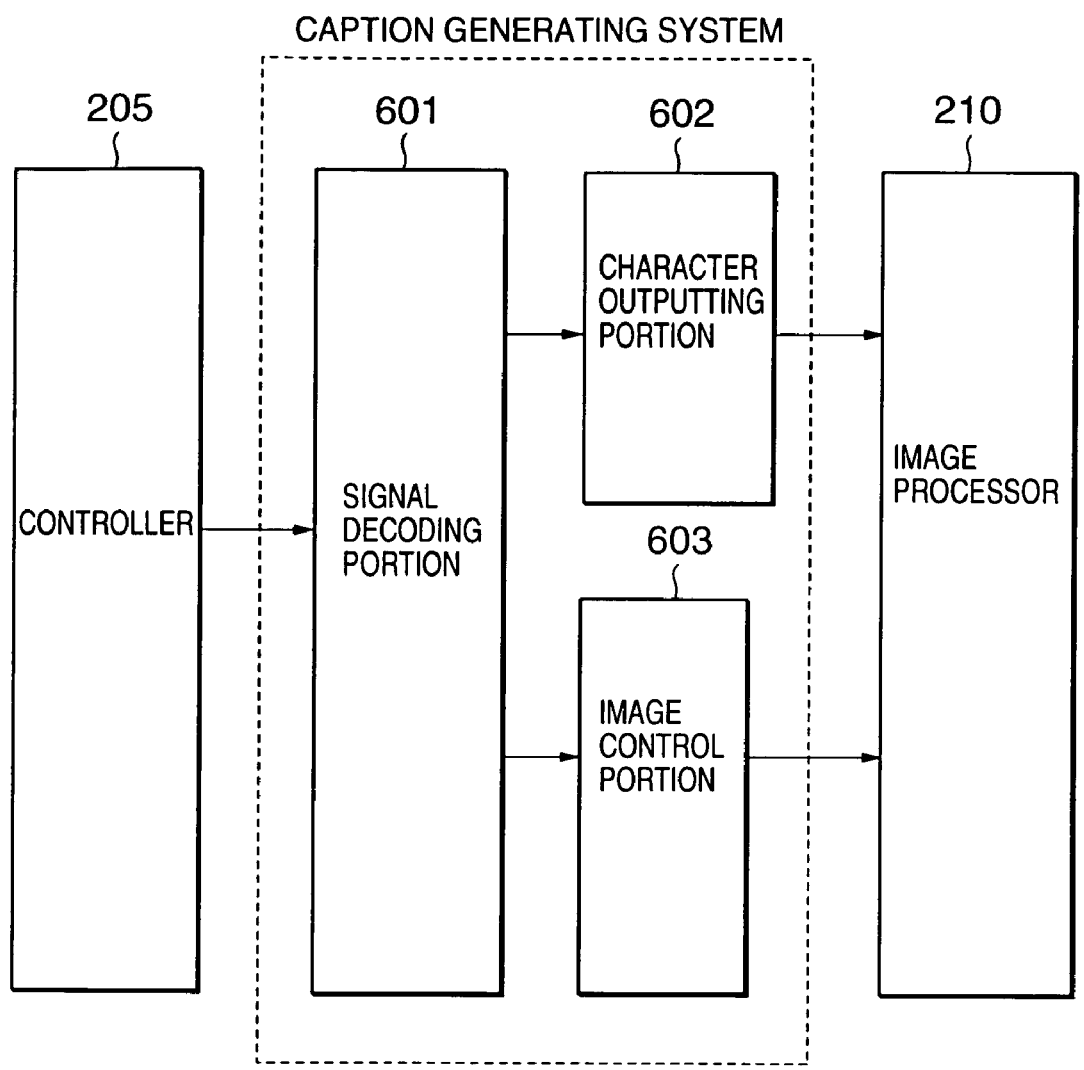
FIG. 6 is a block diagram for showing an inner composition of a caption generating system.
Figure 7:
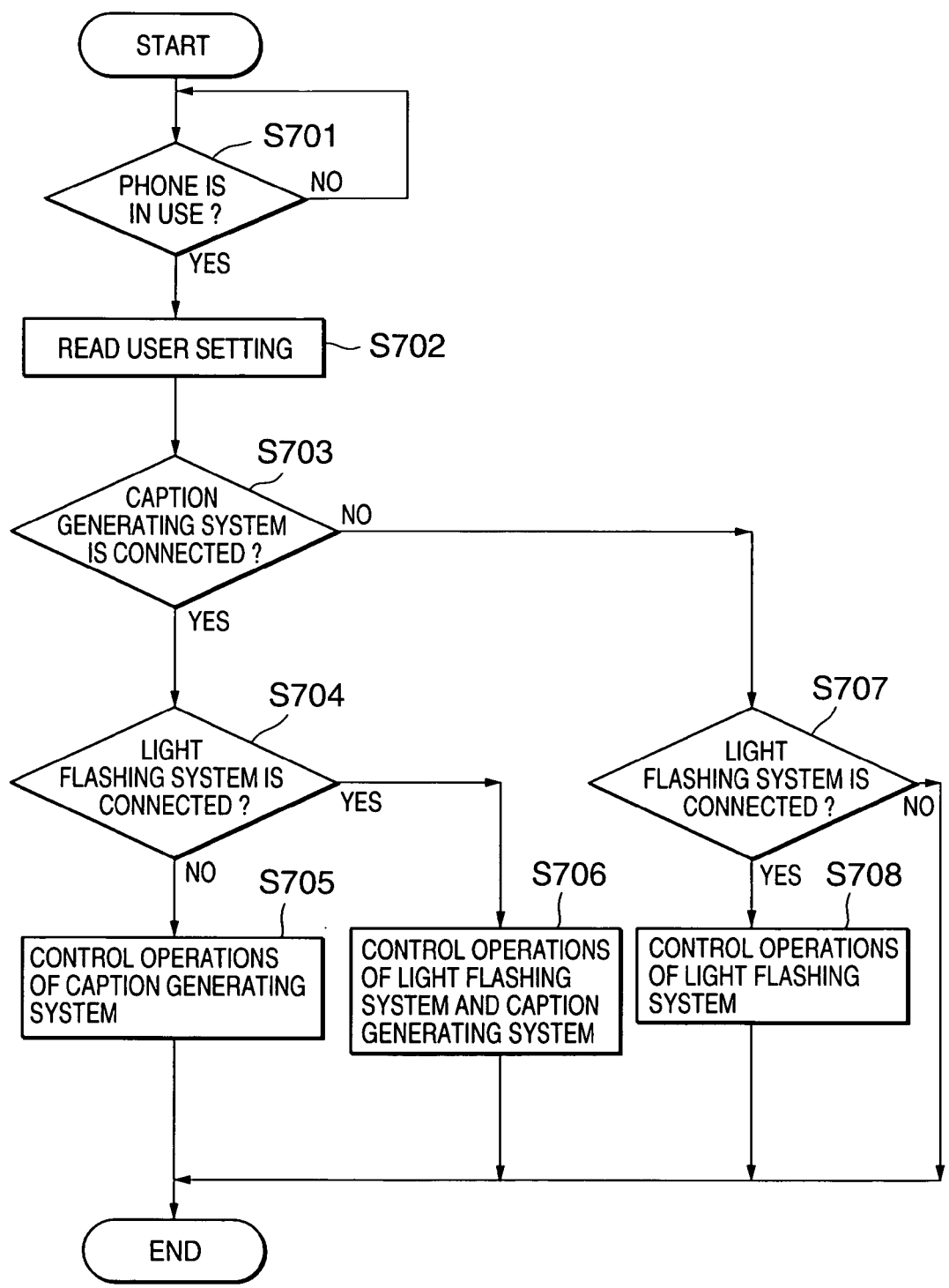
FIG. 7 is a flowchart for illustrating an operation of a controller 205

FIG. 3 is a block diagram for showing an inner composition of the voice processor 203. FIG. 4 is a block diagram for showing an inner composition of the voice sensor 304. FIG. 5 is an illustration for showing an example of a composition of the light flashing system 206. FIG. 6 is a block diagram for showing a composition of the caption generating system 217. And FIG. 7 is a flowchart for illustrating an operation of the controller 205.

Next, referring to FIG. 3 through FIG. 7, an operation of the picture-phone device shown in FIG. 2 is described. Incidentally, indications of the portions and the numerals in FIG. 1 are replaced in FIG. 2 as follows, the monitor 110 as an image outputting system 208, the camera 120 as an image inputting system 209, the speaker 14b as a speaker 201, the mike 14a as a mike 202 and the light flashing system 130 as a light flashing system 206.

The mike 202 collects the voice of the call-sender and outputs the voice as a voice signal with respect to the voice processor 203. The voice signal output from the mike 202 is input with respect to a band-pass-filter portion 301 in the voice processor 203. The band-pass-filter portion 301 eliminates undesired component in the voice signal output from the mike 202. For example, only the component of an audio frequency band (20~20 KHz) in the voice signal is extracted. And the signal from which undesired component is eliminated is output with respect to a voice sensor 304 and an A-D converter 303.

The voice sensor 304 determines whether the phone is in use or not based on the voice signal from the band-pass-filter portion 301 and outputs the result to the controller 205. The A-D converter 303 converts the voice signal from the bandpass-filter portion 301 from analog to digital and outputs the signal as a digital voice data with respect to the voice encoding and decoding system 204.

The voice sensor 304 is composed of comparator 401 as shown in FIG. 4. A reference signal and the voice signal from the band-pass-filter portion 301 is input to the comparator 401. And the comparator 401 determines whether the phone is in use or not by comparing the signal levels of the voice signal with the signal level of the reference signal and outputs the result of the determination with respect to the controller 205.

The voice encoding and decoding system 204 encodes the digital voice data from the A-D converter 303 and outputs the data as a voice code data with respect to the controller 205. Incidentally, for example, ITU-T G. 723 which is a communication scheme of the international standard may be named as a coding scheme.

The image inputting system 209 images the call-sender and outputs the image as an image signal with respect to the image processor 210. The image processor 210 is composed of an A-D converter and a D-A converter to convert the image signal from analog to digital and output the signal as a digital image data with respect to the image encoding and decoding system 211.

The image encoding and decoding system 211 encodes the digital image data and outputs the data as an image code data with respect to the controller 205. Incidentally, for example, ITU-T H. 263 which is a communication scheme of the international standard for a motion image and JPEG (Joint Picture Experts Group) for a static image may be named as a coding scheme.

The controller 205 multiplexes the voice code data and the image code data. Incidentally, for example, ITU-T G. 223 which is a communication scheme of the international standard may be named as a multiplexing scheme. And the controller 205 determines to output the multiplexed data based on the user setting stored in a memory 212 with respect to a telephone network 214 or with respect to the radio circuit.

The controller 205 outputs the multiplexed data to the circuit connector 213, in the event of outputting with respect to the telephone network 214. And the circuit connector 213 transmits the signal with respect to the picture-phone device of the call-receiver via the telephone network 214.

As the telephone network, either of ISDN network or an analog network is acceptable. In the event of the analog network, the circuit connector 213 may be composed of, for example, a modem. And the circuit connector 213 conducts circuit control with respect to the telephone network 214. As the circuit control, for example, an incoming call detection may be named.

On the other hand, in the event of outputting with respect to the radio circuit, the controller 205 outputs the multiplexed data with respect to the radio equipment 215. And the radio equipment 215 transmits the multiplexed data with respect to the radio circuit via the antenna 216. Accordingly, the multiplexed data is transmitted with respect to the picture-phone device of the call-receiver.

The circuit connector 213 receives a signal from the picture-phone device of the call-receiver via the telephone network 214 and outputs the signal with respect to the controller 205. And the radio equipment 215 receives a signal from the picture-phone device of the call-receiver through the antenna 216.

The controller 205 acquires the voice code data which is a data of a voice component and the image code data which is a data of an image component from the signal output from the picture-phone device of the call-receiver. Then the controller 205 outputs the above-mentioned data with respect to the voice encoding and decoding system 204 and the image encoding and decoding system 211 respectively.

The voice encoding and decoding system 204 decodes a voice code data and outputs the data as a digital voice data with respect to the voice processor 203. In the voice processor 203, the digital voice data is input to the D-A converter 302. The D-A converter 302 converts the digital voice data from digital to analog and outputs the data with respect to the band-pass-filter portion 301. Then, the voice signal is output with respect to the speaker 201 after transferring via the band-pass-filter portion 301. And the speaker 201 outputs the voice of the call-receiver based on the voice signal.

The image encoding and decoding system 211 decodes the image code data and outputs the data as a digital image data with respect to the image processor 210. The image processor 210 converts the image data from digital to analog and outputs the data as an image signal with respect to the image outputting system 208. Then the image outputting system 208 projects the image of the call-receiver. Accordingly, the call-sender can make a conversation on the phone looking at the image of the call-receiver projected on the image outputting system 208.

An operation of characteristic portions of the present invention is described as follows. The controller 205 determines whether the phone is in use as of the point of time or not based on the output from the voice sensor 304 in the voice processor 203 (step S701). When the phone is not in use (in the event of NO), the controller 205 is on standby until the line is opened. On the other hand, when the line is in use (in the event of YES), the controller 205 reads the user setting stored in the memory 212(step S702).

Incidentally, the user setting is pre-settable by the command inputting system 207. And there provided (i) a light-on operation of the light flashing system 206, (ii) a light-off operation of the light flashing system 206, and the like.

In addition, the controller 205 determines whether the caption generating system 217 is connected thereto or not (step S703). When the caption generating system 217 is connected to the controller 205, the determination here results in YES.

Next, the controller 205 determines whether the light flashing system 206 is connected thereto or not (step S704). When the light flashing system 206 is connected to the controller 205, the determination here results in YES, again. Accordingly, the controller 205 controls the operations of the light flashing system 206 and the caption generating system 217 (step 706).

Light emitting diode(hereafter called LED), for example, is acceptable for composing the light flashing system 206. In the composition shown in FIG. 5, four pieces of LED are used by being provided on the upper, the lower, the left, and the right portions of the periphery of the camera 120 respectively. Each of the above-mentioned LEDs are numbered as LED 501, LED 502, LED 503 and LED 504.

In the composition shown in FIG. 5, the LED 501 is connected to a power supply Vcc on the anode side via a resistor R and connected to a collector of a transistor (hereafter called Tr) 511 on the cathode side. An emitter of the Tr 511 is grounded. And the LED 501 operates to turn the light on and off depending on the variations of collector current of the Tr 511 which is controlled by a base control current (hereafter called Ib) 521. Additionally, other LED (502 through 504) also have the similar peripheral circuit composition.

The controller 205 has the LED 501 though LED 504 operate to turn the light on and off by controlling the Ib 521 through Ib 524. Incidentally, the above-mentioned operations of the LED 501 through LED 504 are based on the user setting.

The caption generating system 217 generates information for outputting the caption image on the image outputting system 208. The caption image is an image for guiding the caller's line of sight to the image inputting system 209 and can be a variation of characters, patterns or backgrounds of the screen. Incidentally, a setting associated with forms of the caption image, and the like (hereafter called the caption setting) is pre-settable by the user setting. The controller 205 reads the caption setting from the memory 212 and outputs the caption setting with respect to a signal decoding portion 601 in the caption generating system 217 (refer to FIG. 6).

The signal decoding portion 601 decodes the caption setting and extracts a setting associated with a character and an image of the caption image. The setting associated with the character is notified with respect to a character outputting portion 602 and the setting associated with the image is notified with respect to a screen controlling portion 603. The character outputting portion 602 outputs character data for indicating the characters on the image outputting system 208 with respect to the image processor 210. The screen controlling portion 603 outputs the special visual image data for indicating the patterns, and the like on the image outputting system 208 with respect to the image processor 210.

The image processor 210 generates a caption image based on the character data and the special visual image. And, a signal for indicating the caption image is output with respect to the image outputting system 208. Then, the image outputting system 208 indicates the image of the call-receiver as well as the caption image. That is, the caption image is indicated on the image outputting system 208. Incidentally, the caption image is an arrow 150 indicating the direction of the camera 120.

The call-sender apt to turn his or her line of sight in the direction of the image inputting system 209 by the operations of the light flashing system 206 and the indication of the caption image (the arrow 150). As the result, the call-receiver can see the image of the call-sender watching him or her. Accordingly, callers on both ends can have a better communication to each other.

Figure 8:
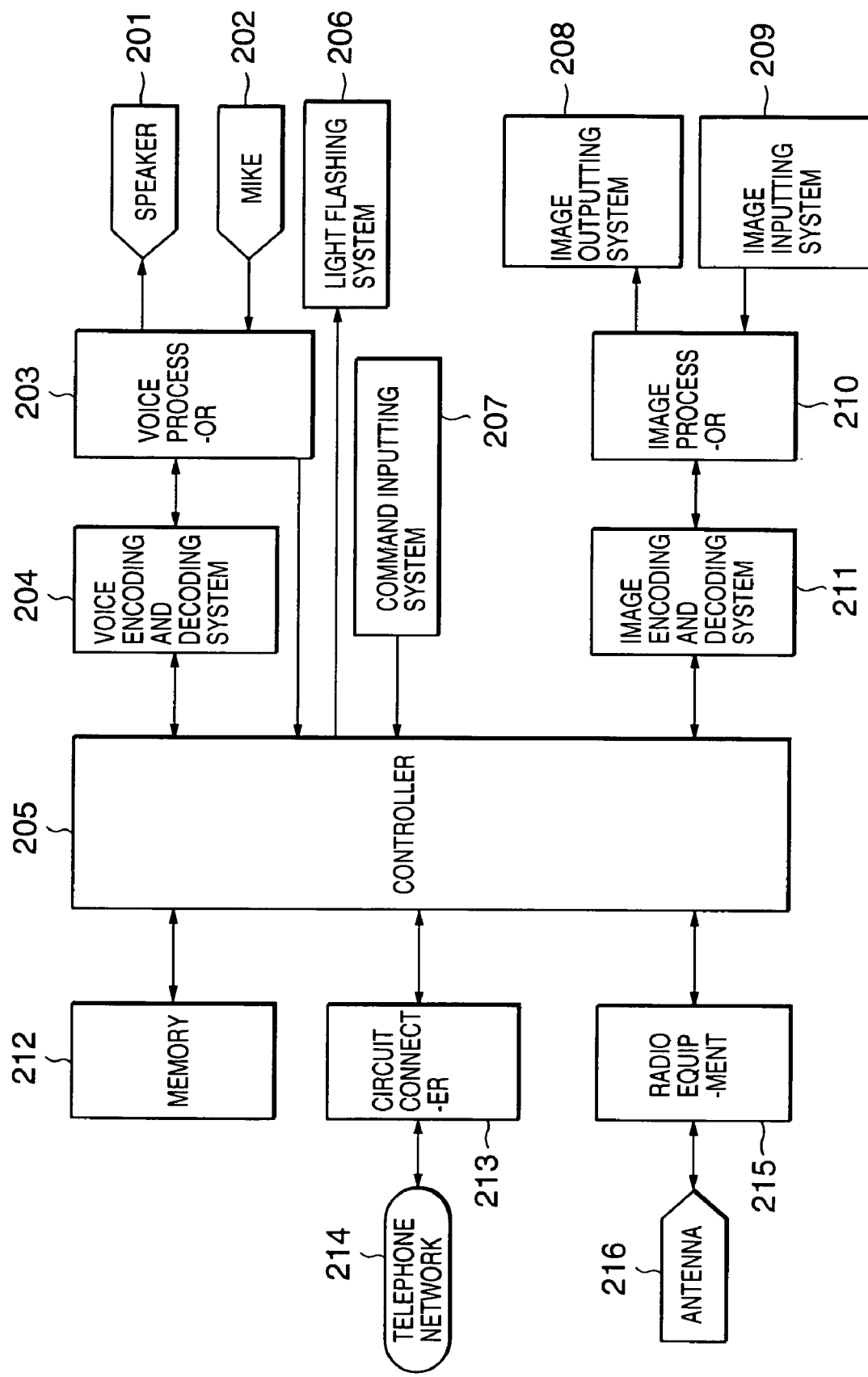
FIG. 8 is a block diagram for showing a composition of another preferred embodiment of the picture-phone device according to the present invention and, FIG. 9 is a block diagram for showing a composition of another preferred embodiment of the picture-phone device according to the present invention.

Next, another preferred embodiment of the picture-phone device according to the present invention is described as follows. FIG. 8 is a block diagram for showing a composition of another embodiment of the picture-phone device according to the present invention. The picture-phone device shown in FIG. 8 is composed as the picture-phone device shown in FIG. 2, in which the caption generating system 217 is uninstalled.

Next, an operation of the picture-phone device shown in FIG. 8 is described. Operations of steps S701 and S702 illustrated in FIG. 7 are similar to the operations of the picture-phone device illustrated in FIG. 2. And the controller 205 determines whether the caption generating system 217 is connected thereto or not (step S703). In the embodiment described here, the caption generating system 217 is not connected with respect to the controller 205. Accordingly, the result of the determination is NO.

Next, the controller 205 determines whether the light flashing system 206 is connected thereto or not (step S707). In the embodiment described here, the light flashing system 206 is connected with respect to the controller 205. Accordingly, the result of the determination is YES. And the controller 205 controls the operations of the light flashing system 206 (step S708). The operations of the light flashing system 206 are similar to the operations in the picture-phone device shown in FIG. 2. Incidentally, in the event the determination in the step 707 results in NO, further process will be discontinued.

The call-sender apt to turn his or her line of sight in the direction of the image inputting system 209 by the operations of the light flashing system 206. As the result, the call-receiver can see the image of the call-sender watching him or her. According to the embodiment described here, even in the event of providing only the light flashing system 206 as means for guiding the line of sight, callers on both ends can have a better communication.

Figure 9:
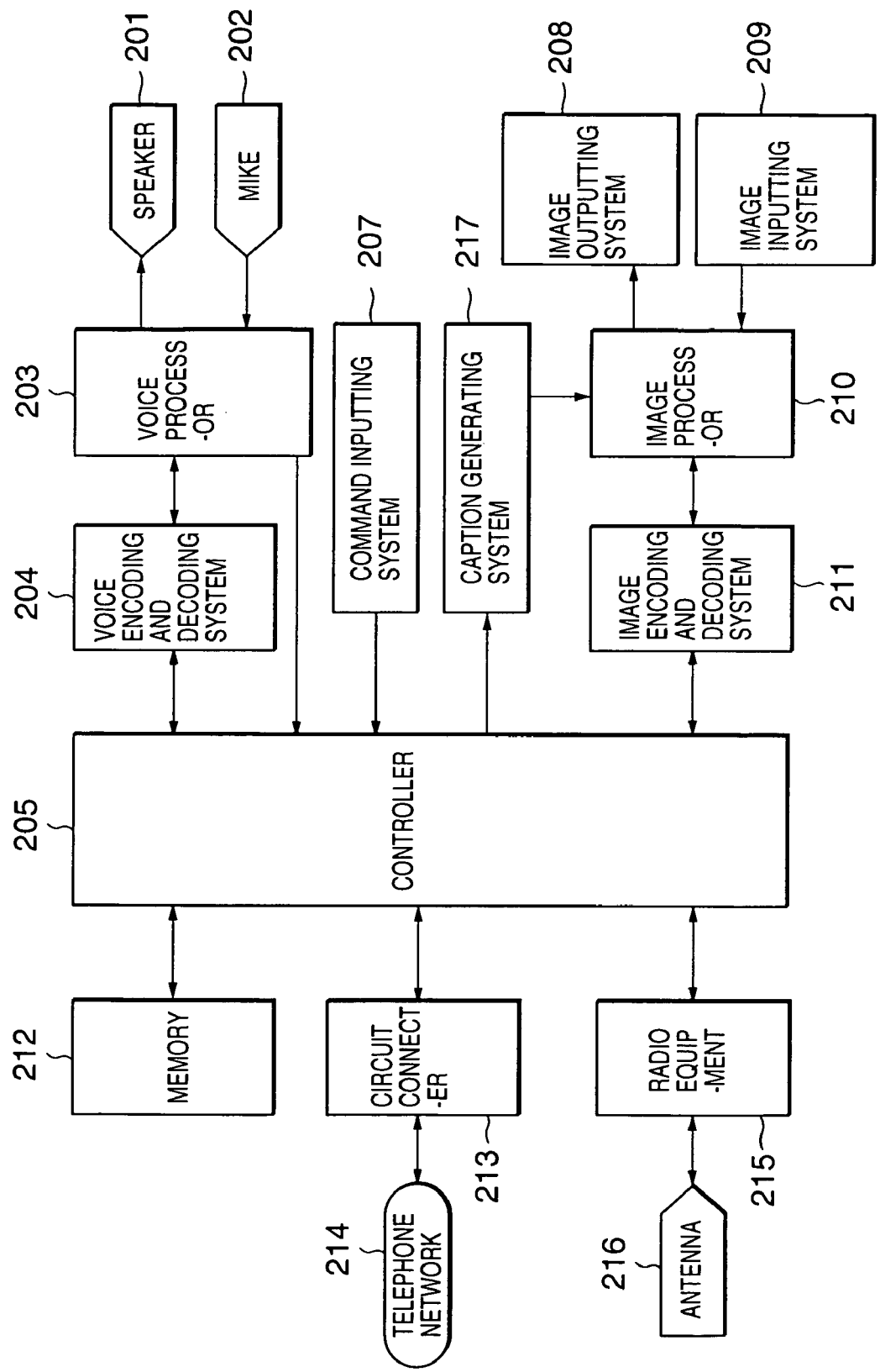

Next, another preferred embodiment of the picture-phone device according to the present invention is described. FIG. 9 is a block diagram for showing a composition of another preferred embodiment of the picture-phone device according to the present invention. The picture-phone device shown in FIG. 9 is composed as the picture-phone device shown in FIG. 2, in which the light flashing system 206 is uninstalled.

Next, an operation of the picture-phone device shown in FIG. 9 is described as follows. Operations of steps S701 and S702 illustrated in FIG. 7 are similar to the operations in the picture-phone device illustrated in FIG. 2 and FIG. 8. And the controller 205 determines whether the caption generating system 217 is connected thereto or not (step S703). In the embodiment described here, the caption generating system 217 is connected with respect to the controller 205. Accordingly, the result of the determination is YES.

Next, the controller 205 determines whether the light flashing system 206 is connected thereto or not (step S704). In the embodiment described here, the light flashing system 206 is not connected with respect to the controller 205. Accordingly, the result of the determination is NO. And the controller 205 controls the operations of the caption generating system 217 (step S705). The operations of the caption generating system 217 are similar to the operations in the picture-phone device shown in FIG. 2.

In the above-mentioned circumstance, the call-sender apt to turn his or her line of sight in the direction of the image inputting system 209 by the indications of the caption image (the arrow 150) on the image outputting system 208. As the result, the call-receiver can see the image of the call-sender watching him or her. According to the embodiment described here, even in the event of providing only the caption generating system 206 as means for guiding the line of sight, callers on both ends can have a better communication.

As it has been described above, according to the picture-phone device according to the present invention, the call-sender apt to turn his or her line of sight in the direction of the image inputting system 209 by the operations of the light flashing system 206 or the indications of the caption image (for example, an arrow 150) on the image outputting system 208. As the result, the call-receiver can see the image of the call-sender watching him or her. Therefore, callers on both ends can have a better communication.

Additionally, it is possible to transmit a smooth image at all time with respect to the picture-phone device of the call-receiver, because the image can be transmitted and received between the picture-phone devices without thinning the number of frames per second. The picture-phone device of the call-receiver can transmit a smooth image with respect to the picture-phone device of the call-sender, in the same manner. Therefore, both callers on the transmitting end and the receiving end can make a conversation without having uncomfortable feeling with respect to the image projected in the picture-phone device.

Further, the light flashing system 206 and the caption generation system 217 are composed simply. Accordingly, it is possible to provide an advantage of lower cost performance in the event of implementing.

According to the invention claimed in claim 1, means for guiding the line of sight for guiding the operator's line of sight to a specific direction is provided in the picture-phone device. As the result, the above-mentioned picture-phone device enables a person on one end of the picture-phone device to see the image of the party on the other end looking at him or her with a simple composition, which effects to provide an intimate communication between the parties on both ends.

According to the invention claimed in claim 2, means for guiding the line of sight provides indicating means which is capable of providing an effect to direct the operator's line of sight to a specific direction by the indications.

According to the invention claimed in claim 3, control means for controlling indicating means in response to the result of the determination whether the phone is in use or not according to the voice inputting signal output from the microphone is provided and effective for giving an indication to direct the line of sight to a specific direction only during a call.

According to the invention claimed in claim 4, indicating means is a light flashing system for guiding the operator's line of sight by light emission and effective for directing the operator's line of sight to the light flashing system by the operations of turning on and off the light of the light flashing system.

According to the invention claimed in claim 5, the light flashing system is provided near the imaging portion and effective for directing the operator's line of sight to the imaging portion.

According to the invention claimed in claim 6, indicating means is a caption outputting system for indicating a special visual image on the image indicating portion in the picture-phone device for guiding the operator's line of sight to a specific direction and effective for guiding the operator's line of sight to a specific direction by indicating the special visual image.

According to the invention claimed in claim 7, the special visual image is an arrow indicating the position where the imaging portion is installed and effective for organizing the situation in which the operator intuitively directs his or her line of sight to the imaging portion.

What is claimed is:

1. A picture-phone device for an operator to exchange images and voices with the party on the other end via a communication circuit, compnsing:
    an imaging portion;
    an image display portion;
    means for guiding the operator's line of sight toward said imaging portion, the means for guiding the operator's line of sight comprising indicating means for giving indications to the operator for guiding the operator's line of sight; and
    control means for controlling indicating means in response to a result of whether the picture-phone is in use or not according to a voice input signal output from a microphone.

2. The picture-phone device claimed in claim 1, wherein said indicating means is a light flashing system for guiding the operator's line of sight by light emission.

3. The picture-phone device claimed in claim 2, wherein the light flashing system is provided near the imaging portion.

4. A picture-phone device for an operator to exchange images and voices with the party on the other end via a communication circuit, comprising:
    an imaging portion;
    an image display portion comprising an inner display field and an outer frame portion, wherein the imaging portion is disposed with respect to the outer frame portion;
    means for guiding the operator's line of sight toward said imaging portion, the means for guiding the operator's line of sight comprising indicating means for giving indications to the operator for guiding the operator's line of sight; and
    control means for controlling said indicating means in response to a result of whether the picture-phone is in use or not according to a voice input signal output from a microphone.

5. The picture-phone device claimed in claim 4, wherein said indicating means is a light flashing system for guiding the operator's line of sight by light emission.

6. The picture-phone device claimed in claim 4, wherein said indicating means is a caption outputting system for projecting a special visual image in order to guide the operator's line of sight.

7. The picture phone device claimed in claim 6, wherein the special visual image is one of the following: an arrow, a variation of characters, patterns or backgrounds in order to guide the operator's line of sight.

8. A picture-phone device for an operator to exchange images and voices with the party on the other end via a communication circuit, comprising:
    an imaging portion;
    an image display portion comprising an inner display field and an outer frame portion, wherein the imaging portion is disposed behind the inner display field;
    means for guiding the operator's line of sight toward said imaging portion, the means for guiding the operator's line of sight comprising indicating means for giving indications to the operator for guiding the operator's line of sight; and
    control means for controlling said indicating means in response to a result of whether the picture-phone is in use or not according to a voice input signal output from a microphone.

9. The picture-phone device claimed in claim 8, wherein said indicating means is a light flashing system for guiding the operator's line of sight by light emission.

10. The picture-phone device claimed in claim 8, wherein said indicating means is a caption outputting system for projecting a special visual image in order to guide the operator's line of sight.

11. The picture phone device claimed in claim 10, wherein the special visual image is one of the following: an arrow, a variation of characters, patterns or backgrounds in order to guide the operator's line of sight.

* * * * *